US009565562B1

(12) United States Patent
Bar-Menachem et al.

(10) Patent No.: US 9,565,562 B1
(45) Date of Patent: Feb. 7, 2017

(54) KNOWLEDGE BASED AUTHENTICATION USING MOBILE DEVICES

(71) Applicant: EMC Corporation, Hopkinton, MA (US)

(72) Inventors: Ika Bar-Menachem, Herzelia (IL); Maya Herskovic, Tel Aviv (IL); Theodor Mihalache, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 14/098,269

(22) Filed: Dec. 5, 2013

(51) Int. Cl.
| | |
|---|---|
| *G06F 21/00* | (2013.01) |
| *H04L 29/06* | (2006.01) |
| *H04W 12/06* | (2009.01) |
| *G06F 21/31* | (2013.01) |
| *G06F 11/30* | (2006.01) |
| *G06F 21/42* | (2013.01) |
| *G06F 21/32* | (2013.01) |
| *H04M 1/66* | (2006.01) |

(52) U.S. Cl.
CPC .............. *H04W 12/06* (2013.01); *G06F 21/31* (2013.01); *H04L 63/08* (2013.01); *H04M 1/66* (2013.01)

(58) Field of Classification Search
CPC ......... H04W 12/06; H04L 29/06; H04L 63/08; H04M 1/66; G06F 21/31
See application file for complete search history.

(56) References Cited

U.S. PATENT DOCUMENTS

| | | | |
|---|---|---|---|
| 7,739,733 B2 | 6/2010 | Szydlo | |
| 8,346,217 B2 * | 1/2013 | Crawford | H04W 12/06 455/410 |
| 8,533,815 B1 * | 9/2013 | Upson et al. | 726/19 |
| 8,631,486 B1 | 1/2014 | Friedman et al. | |
| 8,776,195 B1 | 7/2014 | Avni et al. | |
| 8,850,537 B1 | 9/2014 | Dotan et al. | |
| 8,925,053 B1 | 12/2014 | Mehta | |

(Continued)

FOREIGN PATENT DOCUMENTS

WO    WO 2016018621 A1 *    2/2016    ......... H04L 63/0838

OTHER PUBLICATIONS

Ming Li; Keishi Tajima; "Automatic Generation of Authentication Questions from Private Messages"; 2015 IEEE/WIC/ACM International Conference on Web Intelligence and Intelligent Agent Technology (WI-IAT); Year: Dec. 2015, vol. 1; pp. 505-510.*

*Primary Examiner* — Mohammad W Reza
*Assistant Examiner* — Courtney Fields
(74) *Attorney, Agent, or Firm* — BainwoodHuang

(57) ABSTRACT

A technique of performing knowledge based authentication (KBA) involves collecting activity data and time data based on operation of a mobile device, the activity data identifying an activity performed by the mobile device, and the time data identifying a time of the activity. The technique further involves generating a KBA question based on the activity data and the time data. The technique further involves providing the KBA question to a user to authenticate the user. Such a technique is capable of being performed by a remote server which communicates with the mobile device over time (e.g., in response to certain events, periodically, combinations thereof, etc.). Accordingly, the remote server is able to accumulate activity and time data which is not stored permanently (or perhaps even at all) by the mobile device, and then generate KBA questions based on that data.

15 Claims, 4 Drawing Sheets

(56) References Cited

U.S. PATENT DOCUMENTS

| | | | |
|---|---|---|---|
| 8,955,076 B1 | 2/2015 | Faibish et al. | |
| 9,009,844 B1 | 4/2015 | Corn et al. | |
| 9,021,553 B1 * | 4/2015 | Corn et al. | 726/2 |
| 9,049,596 B1 | 6/2015 | Kronrod | |
| 9,078,129 B1 * | 7/2015 | Dotan | H04W 12/06 |
| 9,092,599 B1 | 7/2015 | Kronrod et al. | |
| 9,092,782 B1 | 7/2015 | Zaslavsky et al. | |
| 9,131,374 B1 | 9/2015 | Avni et al. | |
| 9,300,644 B1 * | 3/2016 | Dubey | H04L 63/08 |
| 2009/0305667 A1 * | 12/2009 | Schultz | 455/410 |

* cited by examiner

KNOWLEDGE BASED AUTHENTICATION USING MOBILE DEVICES

BACKGROUND

In knowledge based authentication (KBA), a human authenticates by answering a set of questions (i.e., one or more questions). If the human answers the set of questions correctly, authentication is considered successful. If the human does not answer the set of questions correctly, authentication is considered unsuccessful.

Conventional KBA questions have been derived from credit bureaus (e.g., "where did you live in 2006?"), government records (e.g., "what type of vehicle did you own in 2007"), and public databases (e.g., what school did you attend in 2008?"). Additionally, the legitimate human may proactively provide answers to certain secret questions during an enrollment period so that the legitimate human can provide correct answers at a later time (e.g., "what was the name of your first pet?"). Accordingly, if the authenticating human is legitimate, the human will correctly answer the set of secret questions to successfully authenticate.

SUMMARY

Unfortunately, there are deficiencies to the above-described conventional KBA questions. For example, KBA questions derived from public data sources such as credit bureaus, government records, and public databases are typically weak since such information is easily accessible due to advances in the Internet and search utilities. Additionally, proactively providing answers to certain secret questions during an enrollment period is burdensome and limits the number of available questions for KBA; that is, due to proactively answering only a limited number of secret questions, the secret questions are often reused thus weakening security.

More recently, KBA questions have been derived from static information stored in a smart phone. For example, suppose that a smart phone maintains a list of contacts including "John Smith". A multiple choice KBA question can be derived such as "which of the following people are in your list of contacts?". Unfortunately, the security of such a KBA question can be overcome by a hacker who simply steals the smart phone and accesses the static information stored in the smart phone, e.g., the hacker simply reads the list of contacts.

Improved techniques are directed to generation of KBA questions from activity data and time data which are based on operation of a mobile device (e.g., a smart phone, a personal assistant device, a tablet, etc.). Such data is collected on an external server for use in KBA questions, and may not be readily available from the mobile device itself. For example, such data can be used to create a multiple choice question such as "what contact did you recently add to your contact list?" where perhaps all of the choices are in the contact list. Even though the contact list is stored on the mobile device, it may be extremely difficult or even impossible for a hacker to determine which contact was recently added if there is no entry time information maintained by the mobile device. Similarly, other strong KBA questions can be created such as "which of the following networks did you use within the last five days?", "which is the last app you installed?", and so on. Even though certain information may be available from the mobile device (e.g., the contact list, the apps, etc.), other information needed to correctly answer the questions may not be stored in the mobile device (e.g., when, which, etc.). Accordingly, the improved techniques provide a strong form of authentication with only the actual mobile device user being able to successfully answer the questions.

One embodiment is directed to a method of performing KBA which includes collecting, by processing circuitry, activity data and time data based on operation of a mobile device, the activity data identifying an activity performed by the mobile device, and the time data identifying a time of the activity. The method further includes generating, by the processing circuitry, a KBA question based on the activity data and the time data. The method further includes providing, by the processing circuitry, the KBA question to a user to authenticate the user. Such a method is capable of being performed by a remote authentication server which communicates with the mobile device over time (e.g., in response to certain events, periodically, combinations thereof, etc.). Accordingly, the remote authentication server is able to accumulate activity and time data which is not stored permanently (or perhaps even at all) by the mobile device, and then generate KBA questions based on that data. As a result, a hacker having access to the mobile device will be unable to extract enough information from the mobile device to correctly answer the KBA questions.

In some arrangements, generating the KBA question based on the activity data and the time data includes forming, as the KBA question, a multiple choice time-based question from the activity data and the time data.

In some arrangements, the time data is not locally stored on the mobile device to prevent a fraudster from discovering an answer to the KBA question through interrogation of the mobile device.

In some arrangements, the multiple choice time-based question queries the user to identify which event of multiple selectable events recently occurred via the mobile device.

In some arrangements, an operating system and a local app runs on the mobile device, the operating system providing an application programming interface (API). In these arrangements, collecting the activity data includes receiving the activity data from the local app running on the mobile device, the local app having extracted the activity data via the API.

In some arrangements, receiving the activity data includes (i) detection of an event by the mobile device and (ii) receipt of the activity data from the mobile device in real time in response to the detection of the event. For example, the activity data can include update information defining an incremental change in information on the mobile device; and wherein the time data includes a current time of receipt of the activity data.

In some arrangements, receiving the activity data includes periodic receipt of lists from the mobile device. For example, the KBA question can be based on a difference between the lists from the mobile device.

In some arrangements, the method further includes receiving, as an answer to the multiple choice time-based question, an incorrect event selection resulting in unsuccessful authentication of the user. In these arrangements, the method further includes performing a remedial operation in response to unsuccessful authentication of the user.

In some arrangements, performing the remedial operation includes providing the user with a step-up authentication challenge in a follow-up attempt to authenticate the user.

In some arrangements, performing the remedial operation includes locking out the user from a protected resource which is otherwise accessible via the mobile device.

In some arrangements, performing the remedial operation includes outputting an alarm to warn an administrator that authentication of the user is unsuccessful.

In some arrangements, performing the remedial operation includes providing the user with a step-up authentication challenge in a follow-up attempt to authenticate the user. In these arrangements, performing the remedial operation further includes, in response to unsuccessful authentication via the step-up authentication challenge, (i) locking out the user from a protected resource which is otherwise accessible via the mobile device, and (ii) outputting an alarm to warn an administrator that authentication of the user is unsuccessful.

It should be understood that, in the cloud context, the processing circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing KBA.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to generation of knowledge based authentication (KBA) questions from activity data and time data which are based on operation of a mobile device (e.g., a smart phone, a personal assistant device, a tablet, etc.). Such data is collected on an external server for use in KBA questions, and may not be readily available (thus protecting the data from discovery) from the mobile device itself. Along these lines, such data can be used to create a multiple choice question such as "what contact did you recently add to your contact list?" where perhaps all of the choices are in the contact list. Even though the contact list is stored on the mobile device, it may be extremely difficult or even impossible for a hacker to determine which contact was recently added if there is no entry time information maintained by the mobile device. Likewise, other strong KBA questions can be created such as "which of the following networks did you use within the last five days?", "which is the last app you installed?", and so on. Even though certain information may be stored in the mobile device (e.g., the contact list, the apps, etc.), other information needed to correctly answer the questions may not be stored (e.g., when, which, etc.). Thus, the improved technique provides a strong form of authentication with only the legitimate mobile device user knowing the correct answers to the questions.

Figure 1:
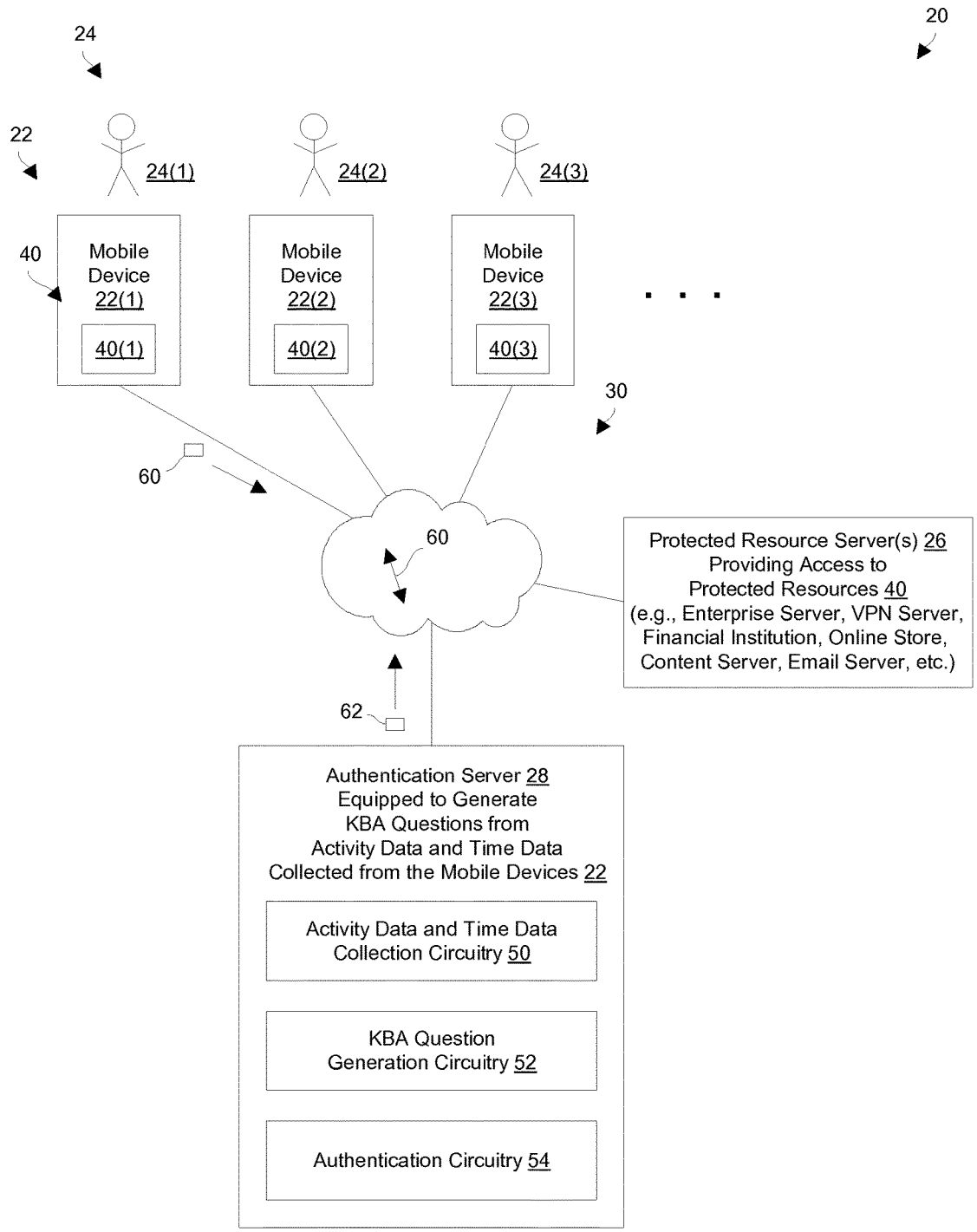
FIG. 1 is a block diagram of an electronic environment which is suitable for knowledge based authentication (KBA) from activity data and time data which are based on operation of a mobile device.

FIG. 1 shows an electronic environment 20 which is suitable for KBA from activity data and time data which are based on operation of a mobile device. The electronic environment 20 includes mobile devices 22(1), 22(2), 22(3), . . . (collectively, mobile devices 22) in possession of their respective users 24(1), 24(2), 24(3), . . . (collectively, users 24), a set of protected resource servers 26, an authentication server 28, and a communications medium 30.

Each mobile device 22 is constructed and arranged to provide controlled access to one or more protected resources 40 on behalf of its respective user 24. Such protected resources 40 may reside locally on the mobile device 22 (e.g., see protected resources 40(1), 40(2), 40(3), . . . ), or remotely on one or more protected resource servers 26. Examples of suitable protected resources 40 include user interface access (i.e., unlocking the mobile devices 22), app access, contact list access, access to stored content, access to particular local features such as a camera, a phone, and so on.

The set of protected resource servers 26 maintain other protected resources 40. Such protected resources 40 are capable of being accessed remotely by the mobile devices 22. Examples of suitable protected resources 40 include (among others) accounts and databases of enterprises, VPNs/gateways/other networks, account access and transaction access with banks/brokerages/other financial institutions, transaction access at online stores, databases containing movies/music/files/other content, access to email, access to online games, and so on.

The authentication server 28 is equipped to generate KBA questions from activity data and time data collected from the mobile devices 22, and then use the KBA questions to authenticate the users 24 of the mobile devices 22. Such authentication can be used to control access to the protected resources 40. As shown in FIG. 1 and as will be described in further detail shortly, the authentication server 28 includes activity data and time data collection circuitry 50 to collect the activity data and time data, KBA question generation circuitry 52 to generate KBA questions from the activity data and time data, and authentication circuitry 54 to authenticate the users 24 using the KBA questions.

The communications medium 30 is constructed and arranged to connect the various components of the electronic environment 20 together to enable these components to exchange electronic signals 60 (e.g., see the double arrow 60). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 24 operate their respective mobile devices 22 to perform useful work. Along these lines, the users 24 can successful authenticate with the authentication server 28, and then access one or more protected resources 40 (e.g., view a file, read email, perform a banking transaction, etc.). Such operation may involve access to protected resources 40 of the mobile devices 22 (e.g., access to certain apps, access to unlock the mobile devices, access to locally stored data, etc.). Alternatively or in combination, such operation may involve access to protected resources 40 of the protected resource servers 26 (e.g., remote login access, remote access to content, ability to complete transactions, etc.). Other access control activities include installing apps, adding contacts, connecting to different networks, accessing resources, and so on. Some mobile devices 22 may be equipped with special peripherals that enable the users 24 to perform additional operations upon successful authentication such as make cellular calls, navigate using maps and GPS circuitry, take pictures, and so on.

During the course of such operation, the mobile devices 22 communicate particular activity-related details 60 to the authentication server 28 for use in subsequent KBA. In particular, the activity data and time data collecting circuitry 50 of the authentication server 28 collects this information even though such information may not be stored on the mobile devices 22 (e.g., stores the activity-related details 60 from the mobile devices 22, stores timestamp information from a server clock, etc.). Additionally, the KBA question generation circuitry 52 of the authentication server 28 generates KBA questions 62 from this information, and authentication circuitry 54 of the authentication server 28 provides the generated KBA questions 62 to the mobile devices 22 to authenticate the users 24 and control access to the protected resources 40.

In some arrangements, the mobile devices 22 communicate the activity-related details 60 to the authentication server 28 in response to detection of certain events (e.g., adding a contact to a contact list, making a cellular phone call, installing a new app, connecting to a network, etc.). Such event driven activity-related details 60 can be communicated to the authentication server 28 in lightweight incremental manner.

In some arrangements, the mobile devices 22 log the activity details 60 for a temporary period of time before communicating the activity-related details 60 to the authentication server 28. Such periodic reporting to the authentication server 28 enables the mobile devices 22 to gather and provide the activity-related details 60 even if mobile devices 22 go offline for periods of time (e.g., if the mobile devices 22 move out of network coverage, etc.).

In some arrangements, the mobiles devices 22 are equipped for both event driven operation and periodic reporting operation. Such capabilities enable the mobile devices 22 to operate in a wide variety of environments, and can be tailored/customized to handle particular situations. It should be understood that other events/activities can be reported from the mobile device 22 to the authentication server 28 either in real time or periodically such as, among others, when the mobile devices 22 is turned on or off, when the mobile device 22 is charging, when the mobile device 22 synching, and so on.

It should be understood that the users 24 initially enroll for KBA and that such enrollment involves installation of a specialized application or app on the user's mobile device 22 with appropriate privileges to enable effective retrieval of the activity data. Additionally, enrollment involves configuring the specialized app to communicate with the authentication server 28 in a trusted/secure manner. In some arrangements, the operating system and/or other applications running on the mobile device 22 provide a standard application programming interface (API) from which to extract the activity details.

Once the specialized app is installed and running, the mobile device 22 is advantageously equipped to perform two specialized types of operations: reporting operations and authentication operations. Reporting involves conveying the activity data to the authentication server 28. Authentication involves challenging a user 24 with one or more KBA questions to determine whether the user 24 is authentic.

In connection with the reporting operations, virtually any activity that is carried out by the mobile device 22 can be conveyed to the authentication server 28 even if no data is stored locally on the mobile device 22 (e.g., see the activity-related details 60 in FIG. 1). Some reporting operations can be event driven, i.e., the mobile device 22 notifies the authentication server 28 when the mobile device 22 performs certain activities (e.g., when a new contact is added to a contact list, when the mobile device 22 connects to a network, and so on). Such event driven behavior is a relatively lightweight operation that does not consume extensive bandwidth, compute cycles, power, or other resources. Additionally, other reporting operations can be scheduled or periodic, i.e., temporarily logged (e.g., buffered) but not stored permanently (e.g., the number of times a phone call to a certain telephone number was made during a particular time period, a list of networks that the mobile device connected with during a particular time period, a time when the mobile device was shut off or charged, and so on).

In connection with authentication operations, the specialized app of the mobile device 22 receives a set of KBA questions from the authentication server 28 (i.e., one or more KBA questions) which are based on the collected activity-related details 60 and time data, and prompts the user 24 of the mobile device 22 for a set of answers which the specialized app then relays to the authentication server 28.

The authentication server 28 then outputs a control signal indicating whether the authentication server 28 deems the user 24 to be authentic (i.e., whether the user 24 successfully authenticated by properly answering the set of questions). If the control signal indicates that authentication is successful, the mobile device 22 provides the user 24 with access to one or more protected resources 40 (e.g., by unlocking a set of keys, by directly allowing the user 24 with resource access, etc.). However, if the control signal indicates that authentication is unsuccessful, the specialized app does not provide the user 24 with access. Rather, the authentication server 28 performs a set of remedial operations (e.g., re-challenges the user 24, performs step-up authentication using a challenge that is stronger than KBA, provides an alarm to a human administrator, locks out the user 24, combinations thereof, and so on.). Further details will now be provided with reference to FIG. 2.

Figure 2:
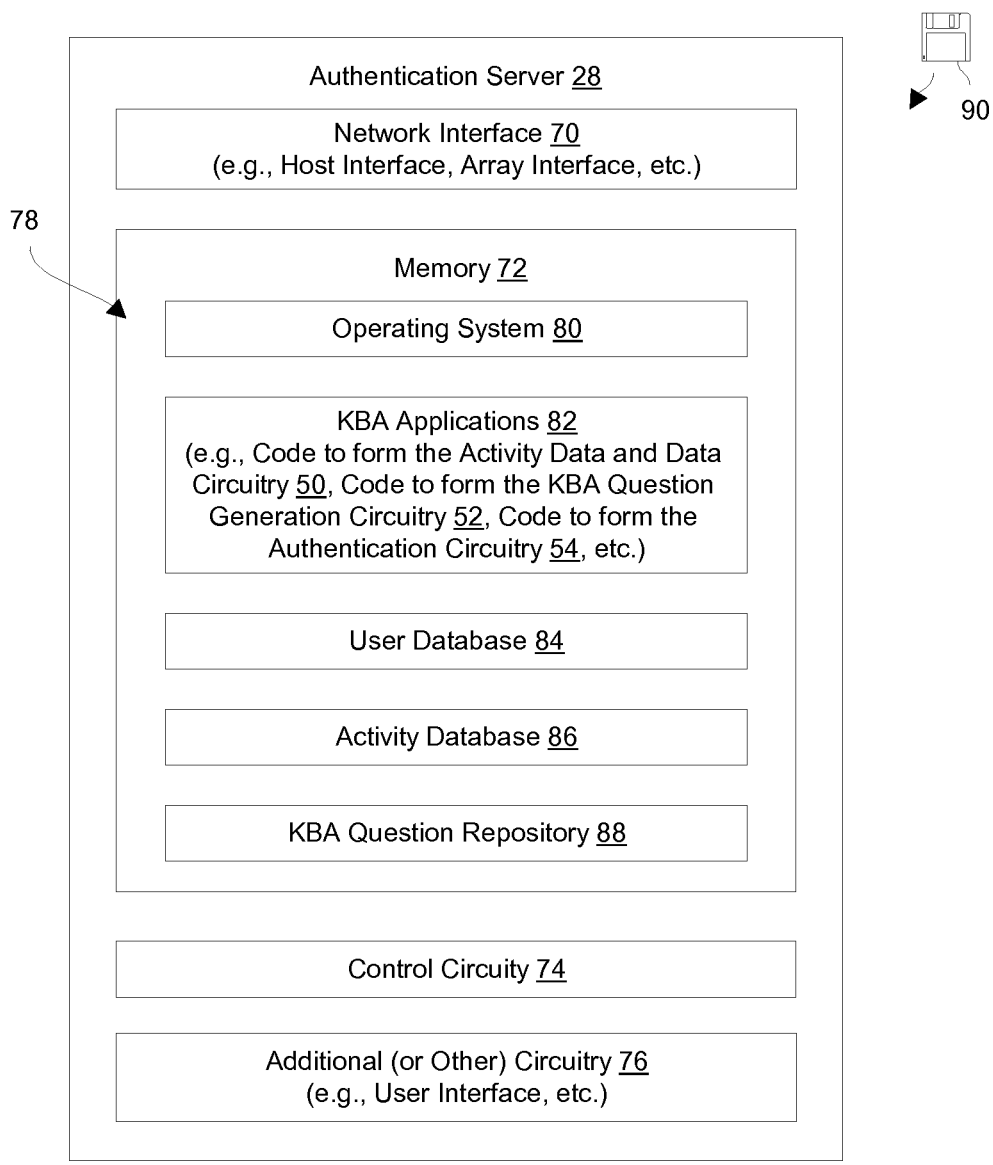
FIG. 2 is a block diagram of an authentication server of the electronic environment of FIG. 1.

FIG. 2 shows particular details of the authentication server 28 of the electronic environment 20. The authentication server 28 includes a network interface 70, memory 72, control circuitry 74, and additional (or other) circuitry 76.

The network interface 70 is constructed and arranged to connect the authentication server 28 to the communications medium 30. Accordingly, the network interface 70 enables the authentication server 28 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 78 including an operating system 80 to manage the computerized resources of the authentication server 28, KBA applications 82 to form the various KBA circuitry 50, 52, 54 of the authentication server 28, a user database 84 to hold user profile information regarding the users 24, an activity database 86 to hold collected activity data and time data, and a KBA question repository 88 to hold generated KBA questions 62 (also see FIG. 1).

The processing circuitry 74 is constructed and arranged to operate in accordance with the various software constructs 78 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the authentication server 28. The computer program product 90 has a non-transitory (or non-volatile) computer readable medium which stores a set of instructions which controls one or more operations of the authentication server 28. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server 28. For example, the authentication server 28 can include a user interface (i.e., a console or terminal) enabling a human administrator to set up new users 24, to deal with alarms or warning messages, to administer routine maintenance, and so on. Other components and circuitry are suitable for use as well.

During operation, the authentication server 28 runs in accordance with the KBA applications 82 to reliably and robustly control access to the protected resources 40 within the electronic environment 20. In particular, the authentication server 28 enrolls users 24 and stores the enrollment data in the user database 84. Additionally, the authentication server 28 collects activity-related details 60 from the mobile devices 22 (FIG. 1) as well as time data (e.g., from a local clock) and saves this information as activity data and time data within the activity database 86. Furthermore, the authentication server 28 generates KBA questions from the activity data and time data within the activity database 86 and stores the KBA questions in the KBA question repository 88.

In connection with the user database 84, the user database 84 includes user profiles for the users 24 of the mobile devices 22. Each user profile includes, among other things, a user identifier to uniquely identify the user 24, a mobile device identifier to uniquely identify the user's mobile device 22, and other descriptive information. In some arrangements, the mobile device 22 is provisioned with additional security features (e.g., is configured as an authentication token, is configured as a container of security keys or other secrets, etc.), and the user database 84 stores copies of this information.

In connection with the activity database 86, the activity database 86 is capable of storing information regarding any activity data that is conveyed to the authentication server 28 (also see the activity-related details 60 in FIG. 1). Recall that activity data can be gathered from the mobile devices 22 in an event driven manner and/or periodically.

Figure 3:
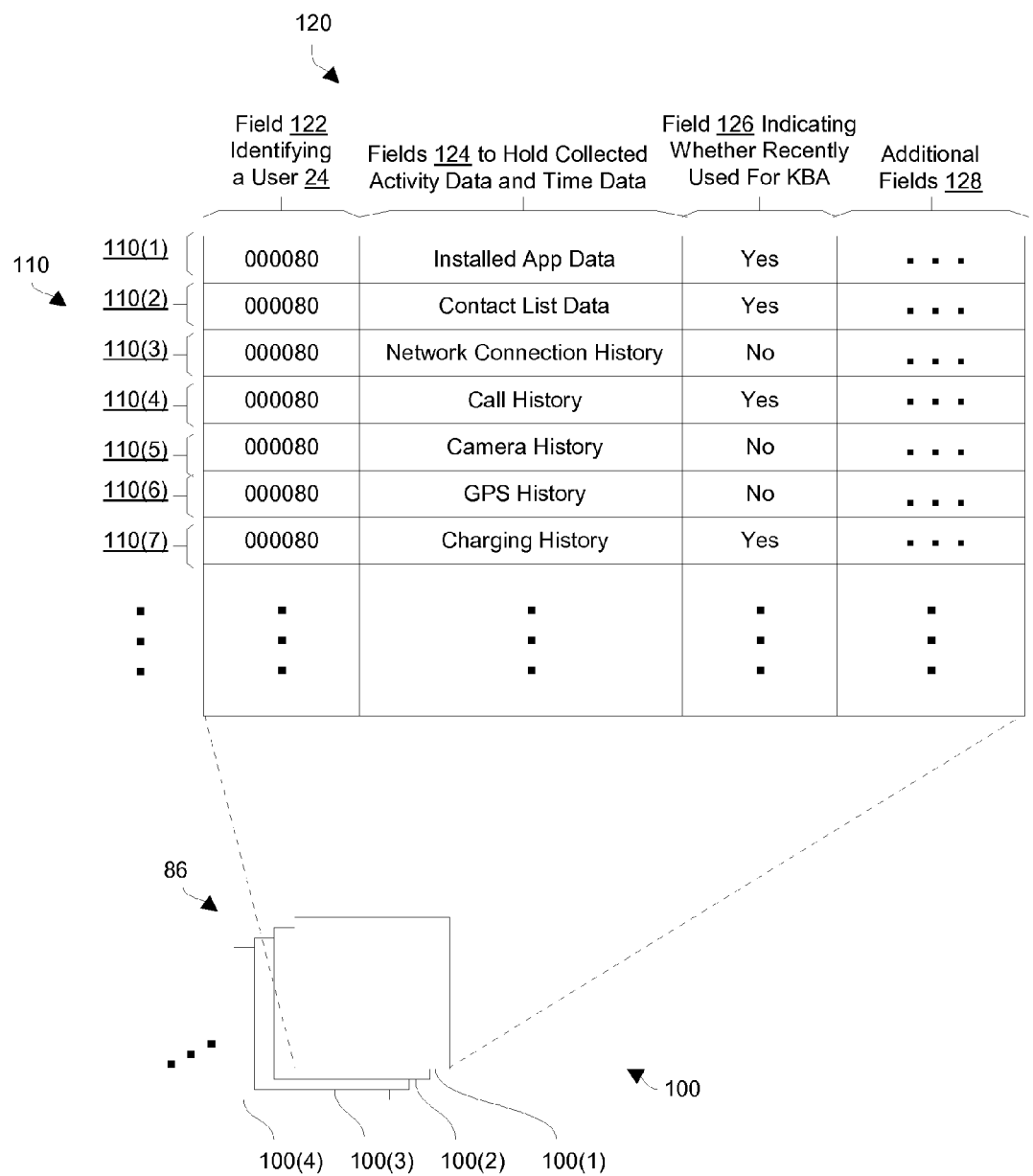
FIG. 3 is a block diagram of particular details of the authentication server of FIG. 2.

FIG. 3 shows an example format for the activity database 86 of the authentication server 28. As shown in FIG. 3, the activity database 86 includes separate sets of database records 100(1), 100(2), 100(3), 100(4), . . . (collectively, record sets 100) corresponding to different mobile devices 22. That is, a set of data records 100(1) stores activity information from a mobile device 22(1) (FIG. 1). Similarly, a set of data records 100(2) stores activity information from a mobile device 22(2), a set of data records 100(3) stores activity information from a mobile device 22(3), and so on.

As further shown in FIG. 3, each set of data records 100 includes different data categories 110(1), 110(2), 110(3), . . . (collectively, categories 110). Additionally, each data category 110 includes multiple fields 120: a user identifier field 122 to hold a user identifier which identifies a particular user 24, fields 124 to hold collected activity and time data relating to the particular user 24 and that category 110, a field 126 indicating whether a KBA question has recently used the information within the fields 124 of that category 110, and additional fields 128 to store other information (e.g.,).

By way of example only, in record set 100(1) (see FIG. 3), the field 122 of category 110(1) stores a user identifier indicating that the data corresponding to category 110(1) belongs to user number "000080". The fields 124 for the category 110(1) store descriptions of apps that have been recently installed on the mobile device 22 (e.g., within the last five days, within the last week, etc.). It should be understood that the authentication server 28 is able to obtain such information in a variety of ways (e.g., receiving such information directly from the mobile device 22, deriving the information from a comparison between a previous list of apps installed on the mobile device 22 and a current list of apps installed on the mobile device 22, etc.). The contents of field 126 (e.g., yes/no, a timestamp, etc.) indicate whether the data in the fields 124 was recently used for mobile KBA. The other fields 128 for the category 110(1) include other information such as an identifier for the mobile device 22, a version identifier of the specialized app running on the mobile device 22, and so on.

Likewise, in the record set 100(1), the other categories 110(2), 110(3), . . . store information regarding other activities performed by the user 24 of the mobile device 22. Other suitable categories 110 include contact list data (e.g., a short list of recently added contacts to a contact list of the mobile device 22, etc.), network connection history (e.g., a short list of networks that were recently connected to by the mobile device 22, etc.), call history (e.g., a list of contacts that were called more than X times during a recent period of time, etc.), camera history (e.g., a timestamp identifying the last time a camera of the mobile device 22 was used, a number of times the camera was used within a recent period of time, etc.), GPS history, charging history, and so on.

In some arrangements, each activity recorded in the activity database 86 includes a timestamp from a local clock of the authentication server 28. Accordingly, the authentication server 28 is able to generate a count of certain activities within a set period of time (e.g., within the last week, 5 days, 3 days, day, hour, etc.).

In connection with the KBA question repository 88 (FIG. 2), the KBA question repository 88 stores KBA questions for use in KBA. In some arrangements, the KBA questions are fully generated ahead of time (e.g., N KBA questions per user 24, where N is a positive integer). In other arrangements, the KBA questions are in template form and the actual KBA questions provided to the users 24 are dynamically formed just prior to delivery to the users 24. In yet other arrangements, the KBA question repository 88 stores both actual KBA questions ready for use and templates for dynamic KBA question generation. In all arrangements, great care and consideration can be provided to create KBA questions which do not offend or embarrass the users 24, and which do not disclose confidential information of the users 24.

Below is a set of example KBA questions that are based on activity data collected from mobile devices 22 and time data. Although some activity information may persist on the mobile device 22, such example questions are relatively strong since the mobile device 22 will not permanently maintain enough activity information to enable a malicious person to fully answer the questions from solely from the information within the mobile device 22.

Which of the following contacts did you recently add to your contact list?

Which of the following networks did you use within the last five days?

Which of the following apps did you install within the last week?

Which of the following devices did this device synch with today?

At which of the following times today did you power off this device?

At which of the following times today did you check your email?

At which of the following times yesterday did you use the camera of this device?

At which of the following times yesterday did you charge this device?

As mentioned earlier, information regarding virtually any activity that is carried out by the mobile device 22 can be conveyed to the authentication server 28 and then used for KBA. Accordingly, other KBA questions are suitable for use as well.

Furthermore, it should be understood that for illustration purposes only the example KBA questions are phrased as multiple choice questions which prompt the user to select a particular choice among multiple selectable choices. Other KBA questions can be generated which require the user 24 provide a text-based answer (e.g., a name, a number, a location, other alphanumeric-entered answers, etc.).

Moreover, it is possible for the authentication server 28 to create KBA questions from multiple mobile device sources. For example, a question such as "what city were you in when you used the camera today?" relies on camera data as well as GPS data. Likewise, a question such as "what network were you connected on when you read an email from John Smith today?" relies on both network data as well as email data. Other creative questions and combinations can be achieved as well. Further details will now be provided with reference to FIG. 4.

Figure 4:
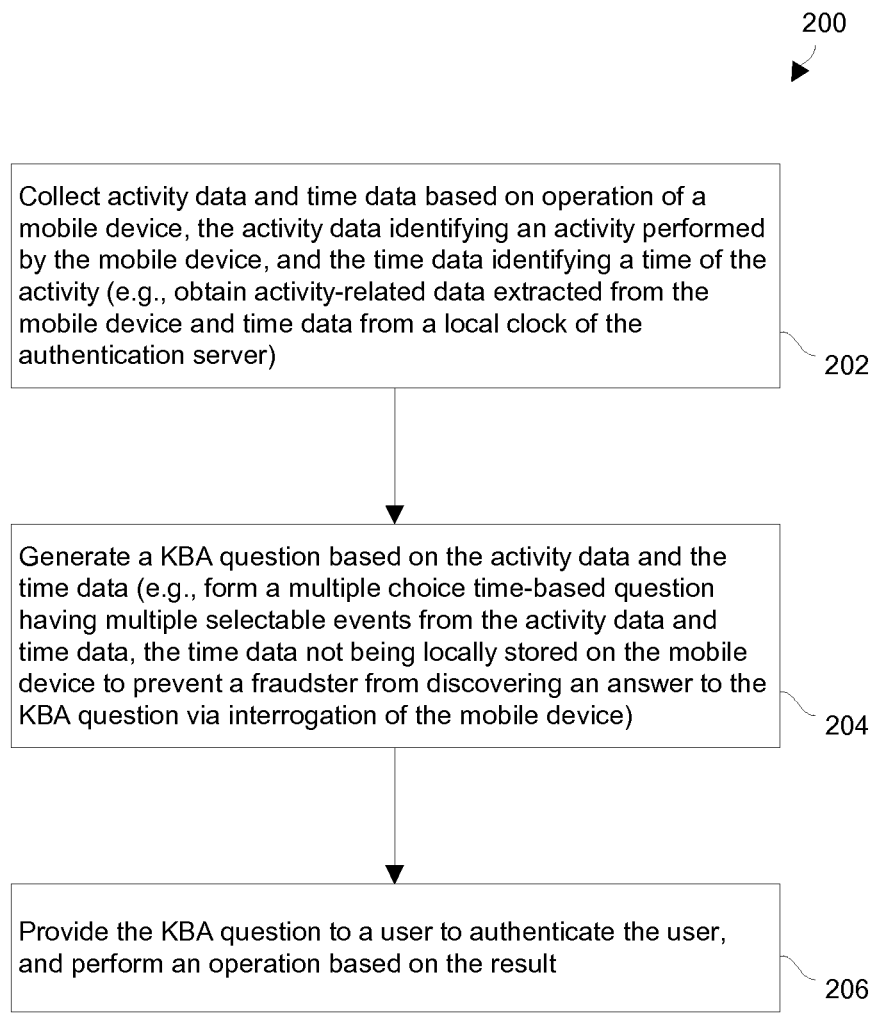
FIG. 4 is a flowchart of a procedure which is performed by the authentication server of FIG. 2.

FIG. 4 is a flowchart of a procedure 200 which is performed by the authentication server 28 when performing mobile KBA. At 202, the authentication server 28 collects activity data and time data based on operation of a mobile device 22. Such data is stored in the activity database 86 (also see FIG. 2). The activity data identifies an activity performed by the mobile device 22. Additionally, the time data identifies a time of the activity. Such data collection may occur over a period of time (e.g., a day, a week, etc.) while the legitimate user 24 uses the mobile device 22 to accomplish useful work.

At 204, the authentication server 28 generates a KBA question based on the activity data and the time data. In particular, the authentication server 28 creates, as the KBA question, a question that difficult or even impossible to answer simply based on information stored in the mobile device 22. Rather, when such information is not stored in the mobile device 22, a fraudster will be unable to discover a correct answer to the KBA question by hacking into the mobile device 22.

At 206, authentication server 28 provides the KBA question to a user to authenticate the user, and performs an operation based on the result. In particular, if authentication is successful, the authentication server 28 allows access to one or more protected resources 40 (e.g., providing keys, unlocking resources, completing transactions, etc.). However, if authentication is unsuccessful, the authentication server 28 performs a remedial operation (e.g., step-up authentication, locking out a user 24, outputting an alarm to an administrator, and so on).

As described above, improved techniques are directed to generation of KBA questions from activity data and time data which are based on operation of a mobile device 22. Such data is collected on an external authentication server 28 for use in KBA questions, and may not be readily available from the mobile device 22 itself. For example, such data can be used to create a multiple choice question such as "what contact did you recently add to your contact list?" where perhaps all of the choices are in the contact list. Even though the contact list is stored on the mobile device 22, it may be extremely difficult or even impossible for a hacker to determine which contact was recently added if there is no entry time information maintained by the mobile device 22. Similarly, other strong KBA questions can be created such as "which of the following networks did you use within the last five days?", "which is the last app you installed?", and so on. Even though certain information may be available from the mobile device 22 (e.g., the contact list, the apps, etc.), other information needed to correctly answer the questions may not be stored (e.g., when, which, etc.). As a result, the improved techniques provide a strong form of authentication with only the actual mobile device 22 user being able to successfully answer the questions.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that a variety of mobile devices are suitable for use in addition to smart phones, personal assistants, and tablets. For example, the above-described techniques can be used with e-readers, mobile e-music devices, mobile gaming devices, laptop computers, and so on.

Furthermore, it should be understood that the format for the activity database 86 (FIG. 3) was described above as including record sets 100 per mobile device 22 by way of example only. Other formats and referencing techniques are suitable for use as well such as relational databases, lists based on user 24 rather than based on mobile device 22, lists based on apps or activities, and so on.

Additionally, it should be understood that some users 24 may have multiple mobile devices 22, and that some mobile devices 22 may be operated by multiple users 24. In such situations, the KBA questions can be tailored to transcend mobile devices 22 (e.g., "when did you last use email on your other mobile device?"). Also, the KBA questions can be tailored to transcend users 24 (e.g., "which user before you last used this mobile device?"). Other combinations can be made as well.

Furthermore, it should be understood that any of the above-described features can be combined and/or arranged to form various improved combinations and/or arrangements. Moreover, the above-described mobile KBA can be used in combination with other forms of authentication such as standard multi-factor authentication (e.g., in combination with passwords, PINs, biometrics, etc.), risk-based or adaptive authentication (e.g., generation of risk scores indicating an amount of riskiness or probability that the person authenticating is a fraudster, etc.), and so on. Such modifications and enhancements are intended to belong to various embodiments of the disclosure.

What is claimed is:

1. A method of performing knowledge based authentication (KBA), the method comprising:
   collecting, by processing circuitry, activity data and time data based on operation of a mobile device which is remote from the processing circuitry, the activity data identifying an activity performed by the mobile device, and the time data identifying a time of the activity;
   generating, by the processing circuitry, a KBA question based on the activity data and the time data; and
   providing, by the processing circuitry, the KBA question to a user to authenticate the user;
   wherein the KBA question has a correct answer;
   wherein information from which to derive the correct answer is omitted from the mobile device prior to providing the KBA question to the user to prevent a malicious person from figuring out the correct answer to the KBA question from the information;
   wherein generating the KBA question based on the activity data and the time data includes forming, as the KBA question, a multiple choice time-based question from the activity data and the time data;
   wherein the time data is not locally stored on the mobile device to prevent a fraudster from discovering the correct answer to the KBA question through interrogation of the mobile device;
   wherein the multiple choice time-based question queries the user to identify which event of multiple selectable events recently occurred via the mobile device;
   wherein an operating system and a local app run on the mobile device, the operating system providing an application programming interface (API);
   wherein collecting the activity data includes receiving the activity data from the local app running on the mobile device, the local app having extracted the activity data via the API;
   wherein receiving the activity data includes (i) detection of an event by the mobile device and (ii) receipt of the activity data from the mobile device in real time in response to the detection of the event;
   wherein the activity data includes update information defining an incremental change in information on the mobile device; and
   wherein the time data includes a current time of receipt of the activity data.

2. A method as in claim 1 wherein receiving the activity data includes periodic receipt of lists from the mobile device.

3. A method as in claim 2 wherein the KBA question is based on a difference between the lists from the mobile device.

4. A method as in claim 1, further comprising:
   receiving, as an answer to the multiple choice time-based question, an incorrect event selection resulting in unsuccessful authentication of the user; and
   performing a remedial operation in response to unsuccessful authentication of the user.

5. A method as in claim 4 wherein performing the remedial operation includes:
   providing the user with a step-up authentication challenge in a follow-up attempt to authenticate the user.

6. A method as in claim 4 wherein performing the remedial operation includes:
   locking out the user from a protected resource which is otherwise accessible via the mobile device.

7. A method as in claim 4 wherein performing the remedial operation includes:
   outputting an alarm to warn an administrator that authentication of the user is unsuccessful.

8. An electronic apparatus, comprising:
   memory; and
   control circuitry coupled to the memory, the memory storing instructions which, when carried out by the control circuitry, cause the control circuitry to:
      collect activity data and time data based on operation of a mobile device which is remote from the electronic apparatus, the activity data identifying an activity performed by the mobile device, and the time data identifying a time of the activity,
      generate a knowledge based authentication (KBA) question based on the activity data and the time data, and
      provide the KBA question to a user to authenticate the user;
   wherein the KBA question has a correct answer;
   wherein information from which to derive the correct answer is omitted from the mobile device prior to providing the KBA question to the user to prevent a malicious person from figuring out the correct answer to the KBA question from the information;
   wherein the control circuitry, when generating the KBA question based on the activity data and the time data, is constructed and arranged to form, as the KBA question, a multiple choice time-based question from the activity data and the time data;
   wherein the time data is not locally stored on the mobile device to prevent a fraudster from discovering the correct answer to the KBA question through interrogation of the mobile device;
   wherein the multiple choice time-based question queries the user to identify which event of multiple selectable events recently occurred via the mobile device;
   wherein an operating system and a local app runs on the mobile device, the operating system providing an application programming interface (API);

wherein the control circuitry, when collecting the activity data, is constructed and arranged to receive the activity data from the local app running on the mobile device, the local app having extracted the activity data via the API;

wherein receiving the activity data includes (i) detection of an event by the mobile device and (ii) receipt of the activity data from the mobile device in real time in response to the detection of the event;

wherein the activity data includes update information defining an incremental change in information on the mobile device; and wherein the time data includes a current time of receipt of the activity data.

9. An electronic apparatus as in claim 8 wherein the control circuitry is further constructed and arranged to:

receive, as an answer to the multiple choice time-based question, an incorrect event selection resulting in unsuccessful authentication of the user, and perform a remedial operation in response to unsuccessful authentication of the user.

10. An electronic apparatus as in claim 9 wherein the control circuitry, when performing the remedial operation, is constructed and arranged to:

provide the user with a step-up authentication challenge in a follow-up attempt to authenticate the user, and in response to unsuccessful authentication via the step-up authentication challenge, (i) lock out the user from a protected resource which is otherwise accessible via the mobile device, and (ii) output an alarm to warn an administrator that authentication of the user is unsuccessful.

11. A computer program product having a non-transitory computer readable medium which stores a set of instructions to perform knowledge based authentication (KBA), the set of instructions, when carried out by computerized circuitry, causing the computerized circuitry to perform a method of:

collecting activity data and time data based on operation of a mobile device which is remote from the computerized circuitry, the activity data identifying an activity performed by the mobile device, and the time data identifying a time of the activity;

generating a KBA question based on the activity data and the time data; and providing the KBA question to a user to authenticate the user;

wherein the KBA question has a correct answer;

wherein information from which to derive the correct answer is omitted from the mobile device prior to providing the KBA question to the user to prevent a malicious person from figuring out the correct answer to the KBA question from the information;

wherein generating the KBA question based on the activity data and the time data includes forming, as the KBA question, a multiple choice time-based question from the activity data and the time data;

wherein the time data is not locally stored on the mobile device to prevent a fraudster from discovering the correct answer to the KBA question through interrogation of the mobile device;

wherein the multiple choice time-based question queries the user to identify which event of multiple selectable events recently occurred via the mobile device;

wherein an operating system and a local app run on the mobile device, the operating system providing an application programming interface (API);

wherein collecting the activity data includes receiving the activity data from the local app running on the mobile device, the local app having extracted the activity data via the API;

wherein receiving the activity data includes (i) detection of an event by the mobile device and (ii) receipt of the activity data from the mobile device in real time in response to the detection of the event;

wherein the activity data includes update information defining an incremental change in information on the mobile device; and wherein the time data includes a current time of receipt of the activity data.

12. A method of performing knowledge based authentication (KBA), the method comprising:

collecting, by processing circuitry, activity data and time data based on operation of a mobile device which is remote from the processing circuitry, the activity data identifying an activity performed by the mobile device, and the time data identifying a time of the activity;

generating, by the processing circuitry, a KBA question based on the activity data and the time data; and providing, by the processing circuitry, the KBA question to a user to authenticate the user;

wherein the KBA question has a correct answer;

wherein information from which to derive the correct answer is omitted from the mobile device prior to providing the KBA question to the user to prevent a malicious person from figuring out the correct answer to the KBA question from the information;

wherein the processing circuitry resides on an authentication server which is separate from the mobile device;

wherein collecting the activity data and the time data includes:

receiving, by the processing circuitry, a first set of activity data and time data from the mobile device during a first communications session between the mobile device and the authentication server, and receiving, by the processing circuitry, a second set of activity data and time data from the mobile device during a second communications session between the mobile device and the authentication server, the second communications session occurring after the first communications session;

wherein generating the KBA question includes:

performing, by the processing circuitry, a comparison operation between the first set of activity data and time data and the second set of activity data and time data to ascertain a set of differences between the first and second sets of activity data and time data, identifying a user event from the set of differences between the first and second sets of activity data and time data, and forming, as the KBA question, a multiple choice question based on the identified user event;

wherein at least one of (i) the first set of activity data and time data and (ii) the second set of activity data and time data is no longer stored on the mobile device when the KBA question is provided to the user;

wherein receiving the first set of activity data and time data includes obtaining a first version of a list of entries from the mobile phone; and wherein receiving the second set of activity data and time data includes obtaining a second version of the list of entries from the mobile phone after the first version of the list of entries is overwritten on the mobile phone by the second version of the list of entries.

13. A method as in claim 12 wherein each entry in the list of entries (i) defines a human contact and (ii) includes a contact name and associated contact information;
  wherein identifying the user event from the set of differences between the first and second sets of activity data and time data includes:
    identifying contacts whose associated contact information has been modified,
    new contacts which have been added, and
    old contacts which have been deleted; and
  wherein forming the multiple choice question based on the identified user event includes forming, as the multiple choice question, a question asking the user to identify a contact which was recently added, recently deleted, or whose associated contact information was recently modified.

14. A method as in claim 12 wherein, at the time of providing the KBA question to the user to authenticate the user, the mobile device stores at most a single version of a list of objects;
  wherein receiving the first set of activity data and time data includes acquiring a first version of the list of objects from the mobile device;
  wherein receiving the first set of activity data and time data includes acquiring a second version of the list of objects from the mobile device, the second version of the list of objects being different from the first version of the list of objects; and
  wherein the identifying the user event from the set of differences between the first and second sets of activity data and time data includes:
    performing a comparison operation that compares the first version of the list of objects to the second version of the list of objects, a result of the comparison operation indicating which objects have been added, deleted and modified; and
  wherein forming the multiple choice question includes creating a question based on the result of the comparison operation that indicates which objects have been added, deleted and modified; the result of the comparison operation being omitted from the mobile device at the time of providing the KBA question to the user to authenticate the user.

15. A method as in claim 14 wherein the first version of the list of objects is a list of apps that are installed on the mobile device during a first time period; and
  wherein the second version of the list of objects is a list of apps that are installed on the mobile device during a second time period after the first time period.

* * * * *